United States Patent [19]
Dion

[11] 3,962,620
[45] June 8, 1976

[54] SWITCHING APPARATUS

[75] Inventor: Warren E. Dion, Bristol, Conn.

[73] Assignee: The Arthur G. Russell Company, Incorporated, Bristol, Conn.

[22] Filed: June 3, 1974

[21] Appl. No.: 475,648

[52] U.S. Cl. .............................. 318/599; 318/601; 318/604
[51] Int. Cl.² ........................................ G05B 11/28
[58] Field of Search .................... 318/599, 601, 604

[56] References Cited
UNITED STATES PATENTS

| | | | |
|---|---|---|---|
| 2,739,626 | 3/1956 | Southworth.................. | 143/120 |
| 3,333,089 | 7/1967 | Saylor et al................... | 318/601 X |
| 3,358,200 | 12/1967 | Clifford........................ | 318/599 X |
| 3,437,826 | 4/1969 | Kelley........................... | 318/599 |
| 3,465,217 | 9/1969 | Kress............................ | 318/601 |
| 3,470,431 | 9/1969 | Jones............................ | 318/663 |
| 3,495,775 | 2/1970 | Dicamillo..................... | 318/601 X |
| 3,560,829 | 2/1971 | Brennan....................... | 318/599 |
| 3,588,710 | 6/1971 | Masters........................ | 318/599 X |
| 3,686,557 | 8/1972 | Futamura..................... | 318/599 |
| 3,789,393 | 1/1974 | Tripp............................ | 318/599 X |
| 3,795,851 | 3/1974 | Gage et al.................... | 318/604 X |

*Primary Examiner*—B. Dobeck
*Attorney, Agent, or Firm*—McCormick, Paulding & Huber

[57] ABSTRACT

A programmer or switching apparatus produces an ON and OFF valued control signal for turning an associated controlled component ON and OFF at preselected points in the variation range of a reference variable. The apparatus includes a reference transducer for converting the reference variable into a reference signal representing the variable. A pair of set-point devices provide a pair of set-point signals which are compared with the reference signal to define operating points at which the control signal switches between its ON and OFF values. The apparatus has the versatility of allowing, by merely setting the set-point devices and without making any circuit changes, the first transition of the control signal to be either from ON to OFF or from OFF to ON as the reference variable increases from its minimum to its maximum value. A number of basic units or parts of basic units may be combined to provide a number of control channels controlling the operation of a number of controlled components in response to the same reference variable. The reference variable may be the angular displacement of a rotatable shaft which may rotate continuously in one direction through repeated revolutions or which may oscillate back and forth between given end points. It may also be the linear displacement of a linearly movable element, or it may be some other continuously variable quantity such as elapsed time, temperature, pressure, liquid level, etc.

9 Claims, 6 Drawing Figures

SWITCHING APPARATUS

BACKGROUND OF THE INVENTION

This invention relates to apparatus for controlling or timing the operation of a controlled component in response to a given reference variable such as the angular displacement of a rotatable shaft, and deals more particularly with such an apparatus wherein the reference variable is converted by a transducer into a corresponding reference signal, used by the remainder of the apparatus, the magnitude of which uniquely identifies a corresponding magnitude of the reference variable.

The apparatus of this invention is intended for use with an active component or load having ON and OFF states and shiftable between such OFF and ON states by a control signal having corresponding OFF and ON values. In a common example, the controlled component is part of a machine, such as an automatic assembly machine, the operation of the component is to be synchronized with the rotation of a given shaft of the machine, and the motive power for the component is provided by an electric solenoid or the like which is sequentially energized and de-energized by the control signal as such signal switches between ON and OFF values. In this example, the reference variable is the angular displacement of the shaft from a given reference position.

A well known type of programmer for turning an associated component ON and OFF at preselected points in the rotation of a shaft is one using a cam fixed to the shaft and a number of switches mounted around the periphery of the cam and shifted between operated and un-operated conditions, as the cam rotates, by the surface of the cam itself or by switch operating pins or the like on the cam. The apparatus of this invention, in this application, is similar in broad function to such an arrangement, but instead of a mechanical cam employs a transducer for producing an output signal the magnitude of which identifies the shaft displacement or position. Other signals of the same character define the points in the shaft movement program at which switching of the control signal between its OFF and ON values is to occur, and a control signal generating circuit including comparators and a digital logic circuit produces a digital, ON and OFF valued, control signal from the shaft position reference signal and the set-point signals. Among other things, this means that only the transducer needs to be mechanically connected with the shaft and to be located on or in the machine. The output signal of the transducer may be conveyed by an appropriate communication line to a control station remote from the rotatable shaft and at which the other parts of the programmer are located. Also, the transducer output signal may be transmitted to both a terminal near the machine and another terminal at a remote control station, and the other parts of the programmer may be built as a portable module connectible to either the near terminal, as may be desirable when setting up the machine, or to the remote terminal, as may be desirable during normal running of the machine.

In other applications of the apparatus of the invention, the reference variable may be one, such as the linear displacement of a linearly movable machine element or a liquid level, which oscillates back and forth within a given range of values. In such applications, the apparatus of this invention can be used to serve the same function as more conventionally served in the past by a set of limit switches defining certain limit values of the reference variable.

Regardless of application, however, an important aspect of the invention is that the involved apparatus has two alternately available switching modes. Assuming that the reference variable is varied from a minimum to a maximum value, in one switching mode the control signal is initially ON so that its first transition is from ON to OFF and its second transition is from OFF to ON. In the alternate switching mode the control signal is initially OFF so that its first transition is from OFF to ON and its second transition is from ON to OFF. Furthermore, the selection of the switching modes is made automatically in response to the settings of the set-point devices without any other changes to the circuitry being required. In particular, one set-point device is dedicated to defining the ON set point at which the control signal goes ON (switches from OFF to ON) and the second set-point device is dedicated to defining the OFF set point at which the control signal goes OFF (switches from ON to OFF), and regardless of which set point is higher or lower than the other, the control signal will go ON at the ON set point and OFF at the OFF set point.

In the description which follows, the invention is shown by way of example to use a rotary resistance potentiometer as the reference variable to reference signal transducer, such potentiometer producing as the reference signal an output voltage having a magnitude analogous to the magnitude of an angular shaft displacement, the reference variable. However, it should be understood that the transducer may take various different forms and that its output need not necessarily be an electrical voltage signal. For example, where the reference variable is an angular shaft displacement, the transducer, instead of being a rotary resistance potentiometer may, among other things, be a rotary induction potentiometer, a selsyn resolver or an analog to digital shaft encoder. That is, the input to the transducer may be any of a large number of different kinds of reference variables and the output of the transducer may likewise by any one of a large number of different quantities such as pressure, force, displacement, frequency, shaft angle, electric current, electric voltage, etc. having a given characteristic the magnitude of which varies in accordance with variations in the magnitude of the reference variable so that each value of the reference signal represents a unique value of the reference variable. It should especially be understood that the reference signal need not necessarily be an analog signal, but may if desired be a digital signal representing a number the value or magnitude of which changes in accordance with changes in the magnitude of the reference variable.

In the description and claims which follow, and in the accompanying drawings, the two values which the control signal and other two valued digital signals may take are usually referred to as the ON and OFF values. When Boolean notation is used, the ON value is taken as the true or 1 value and the OFF value is taken as the false or 0 value.

SUMMARY OF THE INVENTION

This invention resides in a programmer or switching apparatus for producing a control signal for turning an electric solenoid operated device or other similar controlled component ON and OFF at selectively adjustable points in the range of a reference variable. The reference variable is converted to a reference signal by a transducer, for example, a rotary potentiometer in a case where the reference variable is the angular displacement of a given rotary shaft, the reference signal varying with the reference variable along a generally ramp-shaped characteristic curve. A pair of set-point devices provide a pair of selectively variable ON and OFF set-point signals of the same nature as the reference signal. That is, if the reference signal is a voltage the magnitude of which corresponds to the magnitude of the reference variable, then the set-point signals are voltages the magnitudes of which define the associated set points. Similarly, if the reference signal is a binary number the value of which corresponds to the reference variable, then the set-point signals are also binary numbers the magnitudes of which define the associated set points. A control signal generating means compares the set-point signals with the reference signal and in response to such comparisons produces a control signal which goes ON when the reference signal reaches comparison with the ON set-point signal and which goes OFF when the reference signal reaches comparsion with the OFF set-point signal. The comparisons are made by comparators compatible with the nature of the reference and set-point signals and having digital outputs. The signal generating means includes a third comparator for comparing the two set-points signals and for providing a digital indicator signal, indicating whether, as the reference variable increases from a minimum value to a maximum value, the first transition of the control signal is to be from ON to OFF or from OFF to ON. The digital outputs of the three comparators are in turn converted by a logic circuit into the control signal.

DETAILED DESCRIPTION OF THE PREFERRED EMBODIMENTS

Figure 1:
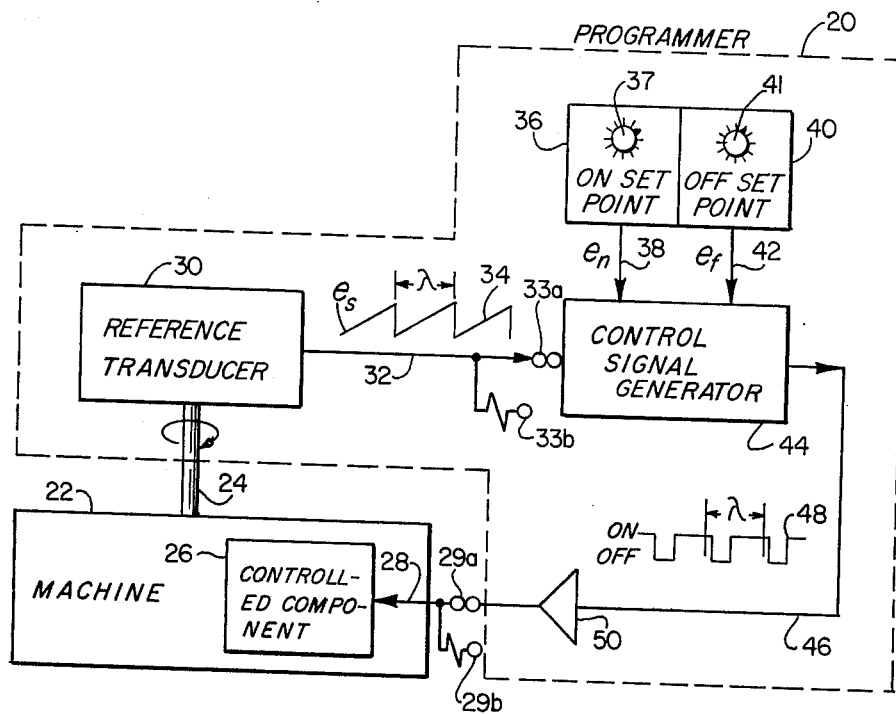
FIG. 1 is a block diagram of a programmer embodying this invention in combination with a machine having a rotatable shaft and a controlled component.

Turning to the drawings and first considering FIG. 1, this figure shows a switching apparatus, in the form of a shaft position switch or programmer 20, embodying this invention, in combination with a machine 22 having a rotatable shaft 24 and a controlled component 26. In this case, the reference variable to which the switching apparatus is responsive is the angular displacement of the shaft 24 from a given reference or zero position. The controlled component 26 is one, such as a device powered by an electric solenoid, having two discrete, ON and OFF, states. It is switched between such ON and OFF states by a control signal, appearing on the line 28, generated by the programmer 20 and having corresponding ON and OFF values.

The programmer 20 of FIG. 1 includes a reference transducer 30 connected with the shaft 24 and operable to produce on the line 32 a reference signal having a magnitude or other quantity which varies generally linearly with the shaft displacement during each revolution of the shaft 24 so that each value of the reference signal represents a distinct shaft displacement. That is, as shown in FIG. 1, the reference signal produced by the transducer 30 has a generally ramp-shaped characteristic curve 34 of reference signal magnitude versus shaft displacement which is repeated during each revolution ($\lambda$) of the shaft. In the illustrated case, the reference signal is taken to be an electrical voltage having an instantaneous value $e_s$.

The programmer 20 of FIG. 1 also includes an ON set-point device 36 which produces on the line 38 an ON set-point signal of selectively variable magnitude and an OFF set-point device 40 which produces on the line 42 an OFF set-point signal of selectively variable magnitude. The magnitude of the ON set-point signal is manually adjustable by a knob 37 on the ON set-point device 36 and the magnitude of the OFF set-point signal is manually adjustable by a knob 41 on the OFF set-point device 40. As indicated, the ON set-point signal is an electrical voltage $e_n$ and the OFF set-point signal is an electrical voltage $e_f$. A control signal generating unit 44 compares the ON and OFF set-point signals $e_n$ and $e_f$ with the shaft position signal $e_s$ and produces on the line 46 an ON and OFF valued signal 48 which goes ON (transfers from its OFF to its ON value) when the shaft position signal $e_s$ reaches comparison with the ON set-point signal $e_n$ and which goes OFF (transfers from its ON to its OFF value) when the shaft position signal $e_s$ reaches comparison with the OFF set-point signal $e_f$, assuming an increasing reference or shaft position signal $e_s$. Conversely, when the reference or shaft position signal $e_s$ is decreasing the signal 48 goes OFF when the signal $e_s$ reaches comparison with the ON set-point signal $e_n$ and goes ON when the signal $e_s$ reaches comparison with the OFF set-point signal $e_f$. The latter signal 48 is amplified by an amplifier 50 to provide a final control signal supplied to the controlled component 26 over the line 28.

Figure 2:
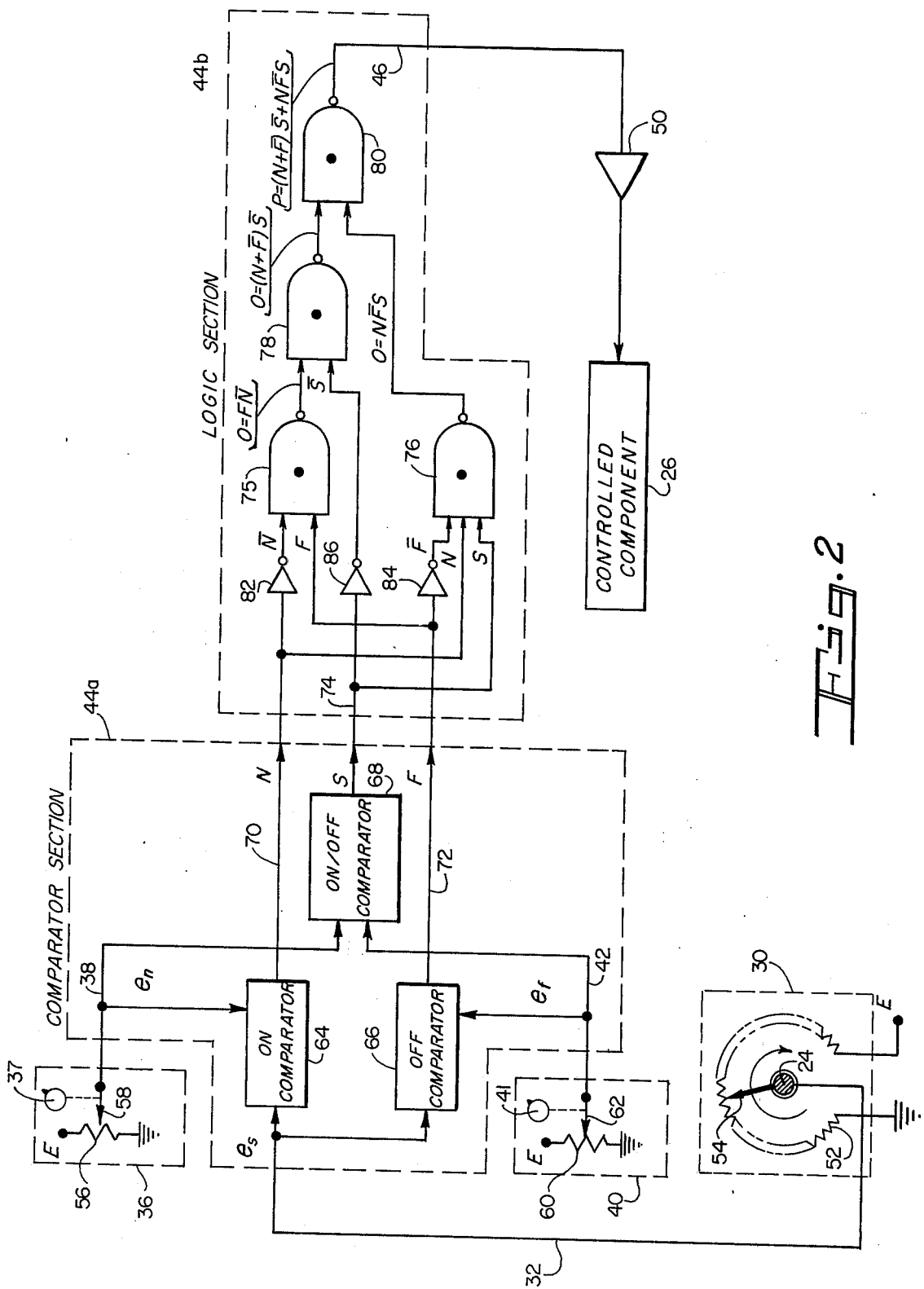
FIG. 2 is a block diagram illustrating in more detail the components of the programmer of FIG. 1.

In FIG. 2, the various parts of the programmer 20 of FIG. 1 are shown in more detail. Referring to this figure, the reference transducer 30 comprises a rotary resistance potentiometer having a circular slide wire 52 and a rotary slider or tap 54 connected to the shaft 24 for rotation therewith. One end of the slide wire 52 is grounded and the other end connected to a fixed voltage E so that as the slider 54 rotates, the voltage $e_s$ appearing on the line 32, to which the slider 54 is connected, varies between zero and E in accordance with the position of the shaft. The ON set-point device 36 comprises another potentiometer having a slide wire 56 and a slider 58 movable relative to the slide wire by the manually operable knob 37. One end of the slide wire 56 is connected to ground and the other to the fixed voltage E so that by manual adjustment of the knob 37 the slider 58 may be moved over the slide wire 56 to produce an ON set-point voltage signal $e_n$, on the line 38 to which the slider 58 is connected, having any selected value between zero and E. Likewise, the OFF set-point device 40 includes another potentiometer having a slide wire 60, connected between ground and voltage E, and a slider 62 movable over the slide wire by the manually operable knob 41 to produce on the line 42, to which the slider 62 is connected, the OFF set-point voltage signal $e_f$ having any selected value between zero and E.

The control signal generating means 44 of FIG. 1 is shown in FIG. 2 to consist of a comparator section 44a and a logic section 44b. The comparator section 44a includes an ON comparator 64, an OFF comparator 66 and an ON/OFF comparator 68. Each of the comparators 64, 66 and 68 is an analog to digital device for comparing two input analog voltage signals and for providing a two valued digital output signal which has one value when one input signal is greater than the other input signal and which has its other value when the one input signal is less than the other input signal. In particular, the ON comparator 64 has as inputs thereto the shaft position signal $e_s$ and the ON set-point signal $e_n$. It compares these signals with one another and produces a two valued (0 or 1) output signal N on the line 70 which is 1 when the shaft position signal $e_s$ is greater than the ON set-point signal $e_n$ and which is 0 when the shaft position signal $e_s$ is less than the ON set-point signal $e_n$. Likewise, the OFF comparator 66 has as inputs thereto the shaft position signal $e_s$ and the OFF set-point signal $e_f$. It compares these two signals with one another and produces a two valued output signal F on the line 72 which is 1 when the shaft position signal $e_s$ is greater than the OFF set-point signal $e_f$ and which is 0 when the shaft position signal $e_s$ is less than the OFF set-point signal $e_f$.

The ON/OFF comparator 68 has as inputs thereto the ON set-point signal $e_n$ and the OFF set-point signal $e_f$. It produces a two valued digital signal S on the line 74 which is 1 when the OFF set-point signal is greater than the ON set-point signal and is 0 when the ON set-point signal is greater than the OFF set-point signal. It should be noted here that the signal S on the line 74 is used to indicate to the logic section 44b whether during each revolution of the rotatable shaft 24 the first transition of the control signal appearing on the line 28 is to be from OFF to ON or from ON to OFF.

Figure 3:
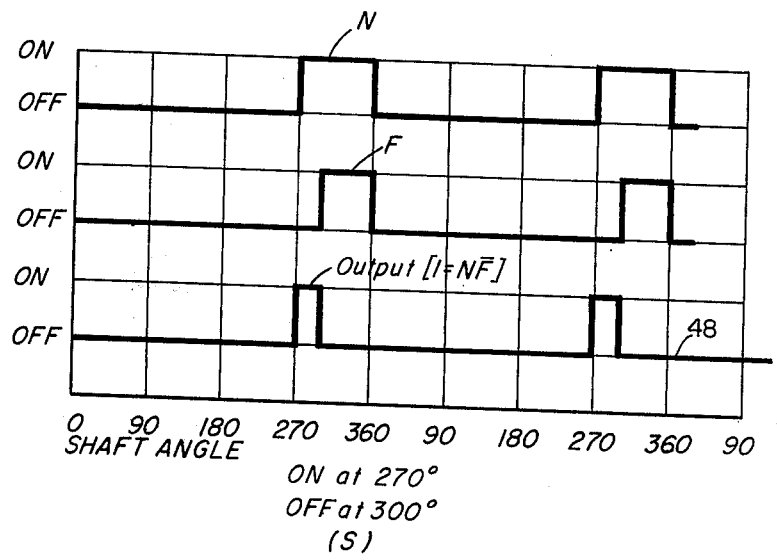
FIG. 3 is a diagram illustrating various signals produced by the programmer of FIG. 2 at different angular positions of the shaft and wherein the ON set-point signal represents a smaller shaft angle than the OFF set-point signal.
Figure 4:
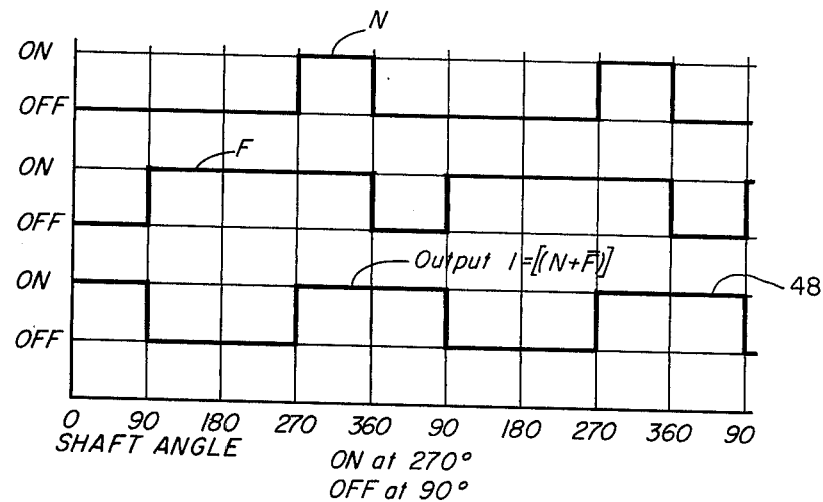
FIG. 4 is similar to FIG. 3 except for depicting a situation in which the ON set-point signal represents a larger shaft angle than the OFF set-point signal.

The logic section 44b of FIG. 2 converts the digital signals N, F and S appearing on the lines 70, 72 and 74 into a control signal P which, for an increasing reference signal $e_s$, transfers from its OFF value to its ON value when the signal $e_s$ reaches comparison with the ON set-point signal $e_n$, as evidenced by the signal N transferring from 0 to 1, and which transfers from its ON to its OFF value when the signal $e_s$ reaches comparison with the OFF set-point signal $e_f$, as evidenced by the signal F transferring from 0 to 1. Referring to FIGS. 3 and 4, these figures show by example two different types of control signals required from the logic section 44b. In one case (FIG. 3), the ON set point is less than the OFF set point so as to require the control signal to be OFF at the beginning of each shaft revolution. In the other case (FIG. 4), the ON set point is greater than the OFF set point so as to require the control signal to be ON at the beginning of each shaft revolution. In both FIGS. 3 and 4, it will be noted that during each revolution of the shaft, the N signal and the F signal both transfer from their initially OFF values to their ON values and after obtaining the ON values retain such ON values until the end of the revolution, occurring at the 360° point, at which point both signals revert back to their OFF values. On the other hand, the control signal does not make any transition at the end of the shaft revolution, the value of the output signal present at the end of the shaft revolution being maintained throughout the initial portion of the next shaft revolution until the first set point is reached. It will be understood from inspection of FIG. 3 that when the ON set point precedes the OFF set point (indicated by the indicator signal S being true or 1), the control signal P should, in Boolean notation, be $P = N \overline{F}$. Also, from FIG. 4 it will be understood by inspection that when the OFF set point precedes the ON set point (indicated by the indicator signal S being false or 0), the control signal P, in Boolean notation, should be $P = (N + F)$. It will, therefore, be further obvious that to take care of both the situation where the ON set point precedes the OFF set point and the situation where the OFF set point precedes the ON set point, the logic section 44b should act to convert the digital signals N, F and S, appearing on the lines 70, 72 and 74 of FIG. 2, into a control signal P having, in Boolean notation, the value $P = (N + \overline{F})S + N\overline{F}\overline{S}$. [Equation 1].

Various different logic circuits may be used, and will be readily apparent to a person skilled in the art, for transforming the digital inputs N, F and S into a control signal P satisfying Equation 1. In the illustrated logic section 44b of FIG. 2 one acceptable form of logic circuit is shown to be comprised of NAND gates 75, 76, 78 and 80 and inverters 82, 84 and 86, arranged and interconnected as shown. The amplifier 50 is a power amplifier for amplifying the control signal P appearing on the line 46 to an amplified version thereof appearing on the line 28 of sufficient power to drive the associated controlled component 26, and it also may take various different forms well known in the art.

Referring again to FIG. 1, the reference transducer 30, since it is driven by the shaft 24 is necessarily located on or near the machine 22. It may usually, particularly if it is a rotary potentiometer, be of a relatively small size so as not to take up much machine space, and since it itself does not require any adjustments to vary the ON and OFF set points, it will be placed at a relatively inaccessible location in the machine, if otherwise advantageous to do so, without seriously impairing the procedures for setting up, servicing or repairing the machine. On the other hand, the other parts of the programmer are not necessarily confined to a location on or near the machine and may, if desired, be placed at some more convenient remote station. Still further, the components of the programmer 20, other than the transducer, may be assembled into the form of a module and the line 32 may be provided with two alternately useable terminals 33a and 33b and the line 28 with two alternately useable terminals 29a and 29b. The terminals 33a and 29a may be located close to the machine 22 and the terminals 33b and 29b at a remote control station. Therefore, when setting up or adjusting the machine, the programmer module may be connected to the near terminals 33a and 29a to have the module close at hand, as for example to allow the operator to more readily observe the effect of adjustments on the operation of the machine, and after the setting up or adjustment is completed the module may be moved to the control station and connected to the remote terminals 33b and 29b.

The programmer 20 described above in connection with FIGS. 1 to 4 has been shown and described in an application where the reference variable is the angular displacement of a shaft 24 taken to rotate continually in one direction so as to produce repeated cycles, one per revolution, of increasing reference signal $e_s$. It will be readily appreciated, however, that the shaft 24 could also be one which oscillates back and forth between two end points and that the programmer 20 would still operate to switch the control signal at selected points in the displacement range of the shaft as established by the settings of the set-point devices 36 and 40. For example, assume that the set-point devices are set as indicated in FIG. 3 and that the shaft oscillates between a minimum displacement of 10° and a maximum displacement of 350°. During the forward motion of the shaft (from 10° to 350°) the control signal 48 will go ON at 270° and go OFF at 300°, and during the reverse motion of the shaft (from 350° to 10°) the control signal will go ON at 300° and go OFF at 270°. Similarly, assume that the set-point devices are set as indicated in FIG. 4 and that the shaft again oscillates between 10° and 350°. In this case, during forward motion of the shaft the control signal will go OFF at 90° and go ON at 270°, and during reverse motion of the shaft the control signal will go OFF at 270° and go ON at 90°.

Recognizing that the programmer 20 of FIGS. 1 to 4 may be used with an oscillating shaft, as well as with a unidirectionally rotating shaft, it will further be appreciated that the shaft could be driven, as by a rack and pinion or cable and pulley drive, by a linearly oscillatable part so as to have the linear displacement of such part from a given reference position as the reference variable to which the programmer is responsive. Also, in any application of the programmer 20 the reference transducer 30 could be an analog to digital encoder having a digitally coded output representing the shaft displacement. In this case, the set-point devices 36 and 40 would be ones having similar digitally coded outputs and the three comparators 64, 66 and 68 would be digital comparators.

Figure 5:
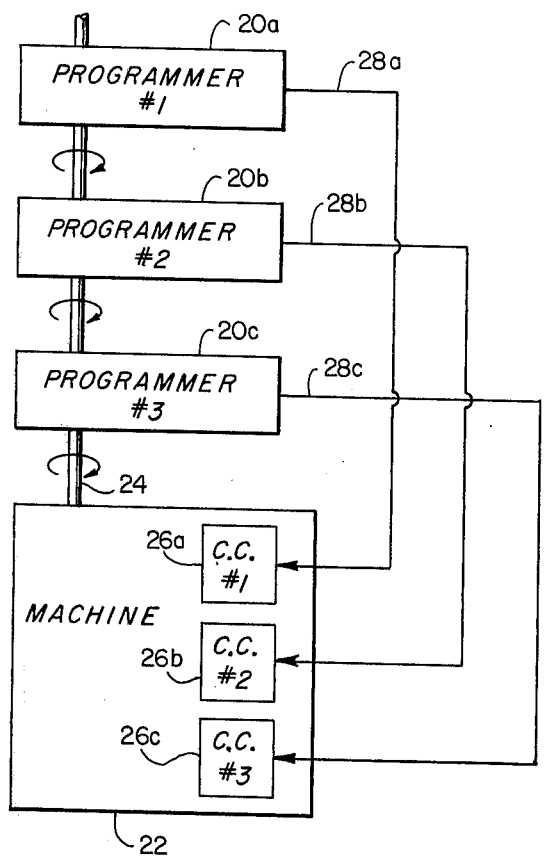
FIG. 5 is a block diagram showing a number of programmers such as that of FIG. 1 in combination with a machine having a rotatable shaft and a number of controlled components controlled by control signals from the programmers.

The programmer 20 described above in connection with FIGS. 1 to 4 provides a single control signal for controlling a single controlled component in accordance with a single program of ON-going and OFF-going transitions during each shaft revolution. Such single control signal could also be supplied simultaneously to a group of controlled components all operating in unison. Often, however, a machine may be comprised of a number of controlled components, or groups of controlled components, which are necessarily driven in accordance with different switching programs. To provide a number of different control signals for such a machine, a number of programmers 20a, 20b and 20c, as shown in FIG. 5, each similar to the programmer 20 of FIG. 1, may be connected with the rotatable machine shaft 24. These programmers accordingly produce different control signals, all synchronized with the rotation of the shaft, appearing on separate lines 28a, 28b, 28c for controlling associated controlled components 26a, 26b, 26c of the machine 22.

Figure 6:
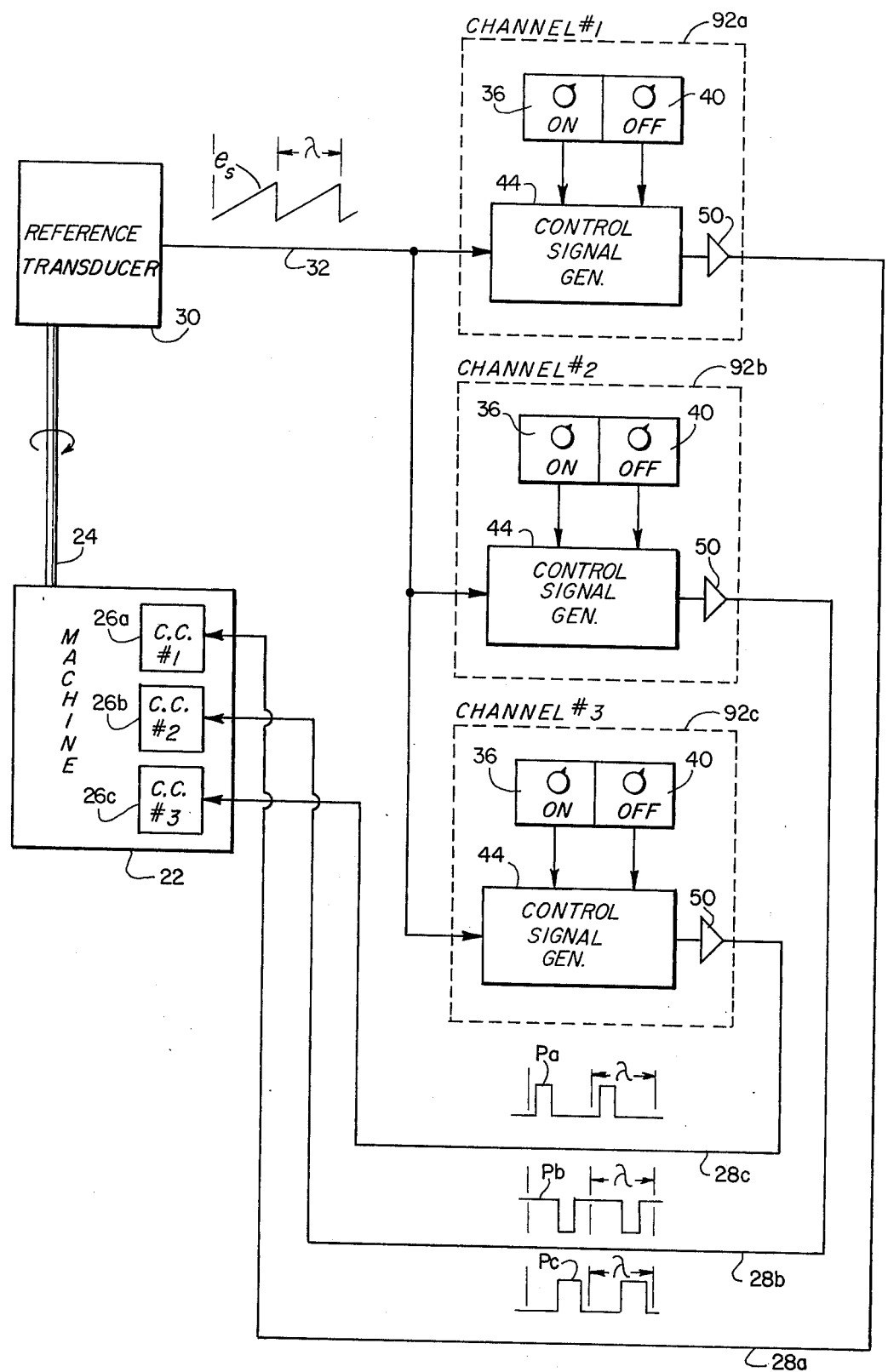
FIG. 6 is a block diagram showing another embodiment of the invention for providing a number of different control signals for a machine having a number of controlled components.

In the system of FIG. 5, it will be understood that each of the illustrated programmers 20a, 20b and 20c is similar to the programmer 20 of FIG. 1 and includes its own separate rotary potentiometer or other reference transducer. Instead of this, another system, as shown in FIG. 6, may be provided wherein a single shaft position transducer 30 generates a reference or shaft position signal used in common by a number of programmer units 92a, 92b and 92c. Each programmer unit 92a, 92b or 92c is comprised of an ON set-point device 36 and an OFF set-point device 40, identical to the devices 36 and 40 of FIG. 1, and of a control signal generator 44 and amplifier 50, identical to the control signal generator 44 and amplifier 50 of FIG. 1.

In addition to a number of programmers or parts of programmers being combined to provide a number of separate control channels for a number of separate controlled components, as in FIG. 5 or in FIG. 6, it will also be apparent that a single control channel may contain two or more programmers to provide more than two set points for the component controlled by the channel. For example, the outputs of two programmers, such as the programmer 20 of FIGS. 1 and 2, could be applied in parallel to a single controlled component to provide two ON set points and two OFF set points in the switching program for such controlled component as the reference variable varies throughout its full range. One valuable aspect of this invention is indeed the fact that the programmer or switching apparatus involved may be made as a basic module or building block readily combinable with identical modules to fabricate a more complex control system having a number of control channels and/or more than two set points per channel.

I claim:

1. A switching apparatus for producing an ON and OFF valued control signal which switches from one value to the other at adjustable selected points in the variation range of a given reference variable, said switching apparatus comprising: a reference transducer having said reference variable as an input thereto and operable to convert said reference variable to a reference signal the magnitude of which reference signal corresponds to the magnitude of said reference variable, an ON set-point device for producing an ON set-point signal having a selectively variable magnitude, an OFF set-point device for producing an OFF set-point signal having a selectively variable magnitude which may be either higher or lower than the magnitude of said ON set-point signal, and a control signal generating means responsive to said reference signal, to said ON set-point signal and to said OFF set-point signal for generating an ON and OFF valued control signal which, as said reference signal increases in magnitude and regardless of whether said ON set-point signal is of a higher or lower magnitude than said OFF set-point signal, switches from its OFF to its ON value when said reference signal reaches comparison with said ON set-point signal and which switches from its ON to its OFF value when said reference signal reaches comparison with said OFF set-point signal.

2. A switching apparatus as defined in claim 1 further characterized by said control signal generating means including an ON comparator for comparing said reference signal with said ON set-point signal and for producing a two valued output signal which is one value when said reference signal is less than said ON set-point signal and which is of its other value when said reference signal is greater than said ON set-point signal, on OFF comparator for comparing said reference signal with said OFF set-point signal and for producing a two valued output signal which is of one value when said reference signal is less than said OFF set-point signal and which is of its other value when said reference signal is greater than said OFF set-point signal, a third comparator for comparing said ON set-point signal with said OFF set-point signal and for producing a two valued indicator signal which is of one value when the magnitude of said ON set-point signal is lower than that of said OFF set-point signal and which is of its other value when the magnitude of said OFF set-point signal is lower than that of said ON set-point signal, and a logic device for transforming the information provided by the two-valued output signals of said three comparators into said ON and OFF valued control signal.

3. A switching apparatus responsive to a given reference variable and comprising: a reference transducer having said reference variable as an input thereto and operable to convert said reference variable to a reference signal the magnitude of which reference signal corresponds to the magnitude of said reference variable, an ON set-point device for producing an ON set-point signal of selectively variable magnitude, an OFF set-point device for producing an OFF set-point signal of selectively variable magnitude, an ON comparator for comparing said ON set-point signal with said reference signal, an OFF comparator for comparing said OFF set-point signal with said reference signal, a third comparator for comparing said ON set-point signal with said OFF set-point signal, and a logic device responsive to the outputs of said three comparators for providing an ON and OFF valued control signal which, for an increasing reference variable, goes ON when said reference signal reaches comparison with said ON set-point signal and goes OFF when said reference signal reaches comparison with said OFF set-point signal regardless of whether said ON set-point signal is of a higher or lower magnitude than that of said OFF set-point signal.

4. A switching apparatus as defined in claim 3 further characterized by said reference transducer being a device operable to produce an output voltage the instantaneous magnitude of which directly corresponds to the instantaneous magnitude of said reference variable, said ON set-point device being a means for producing an ON set-point signal in the form of an output voltage of selectively variable magnitude, and said OFF set-point device likewise being a means for producing an OFF set-point signal in the form of an output voltage of selectively variable magnitude.

5. A switching apparatus as defined in claim 4 further characterized by said reference transducer comprising a rotary potentiometer, said ON set-point device comprising a manually adjustable potentiometer, and said OFF set-point device comprising another manually adjustable potentiometer.

6. A switching apparatus responsive to a given reference variable and comprising: a reference transducer having said reference variable as an input thereto and operable to convert said reference variable to a reference signal the magnitude of which reference signal corresponds to the magnitude of said reference variable, an ON set-point device for producing an ON set-point signal of selectively variable magnitude, an OFF set-point device for producing an OFF set-point signal of selectively variable magnitude, an ON comparator for comparing said ON set-point signal with said reference signal, an OFF comparator for comparing said OFF set-point signal with said reference signal, said ON comparator having a two valued (0 and 1) output signal N which is 0 when said ON set-point signal exceeds said reference signal and which is 1 when said ON set-point signal is less than said reference signal, said OFF comparator having a two valued (0 and 1) output signal F which is 0 when said OFF set-point signal exceeds said reference signal and which is 1 when said OFF set-point signal is less than said reference signal, a third comparator for comparing said ON set-point signal with said OFF set-point signal and for producing as its output a signal S which is 1 when said ON set-point signal is less than said OFF set-point signal and which is 0 when said ON set-point signal is greater than said OFF set-point signal, and a digital logic circuit for converting said signals N, F and S into a two valued digital output signal P, where, in Boolean notation, $P = (N + \overline{F})S + (NFS)$.

7. A shaft angle responsive switching apparatus for use with a rotatable shaft and comprising: a reference transducer for producing a shaft position reference signal having a generally ramp-shaped characteristic curve of signal magnitude versus angular shaft displacement, an ON set-point device for producing an ON set-point signal of selectively variable magnitude, an OFF set-point device for producing an OFF set-point signal of selectively variable magnitude, and a control signal generating means for generating an ON and OFF valued control signal which, as said shaft position reference signal increases in magnitude and regardless of whether said ON set-point signal is of a higher or lower magnitude than said OFF set-point signal, switches from its OFF to its ON value when said shaft position reference signal reaches comparison with said ON set-point signal and from its ON to its OFF value when said shaft position signal reaches comparison with said OFF set-point signal, said control signal generating means including an ON comparator for comparing said shaft position reference signal with said ON set-point signal, an OFF comparator for comparing said shaft position reference signal with said OFF set-point signal, a third comparator for comparing said ON set-point signal with said OFF set-point signal, and a logic device for transforming the information provided by said three comparators into said ON and OFF valued control signal.

8. A shaft angle responsive switching apparatus as defined in claim 7 further characterized by the output of said ON comparator, of said OFF comparator and of said third comparator being two valued signals N, F and S respectively, and said logic device being one for converting said signals N, F and S into said control signal, P, where, in Boolean notation, $P = (N + \overline{F})S + (NFS)$.

9. The combination comprising a machine having a rotary shaft and a controlled component with ON and OFF states, a reference transducer connected with said rotary shaft for producing a shaft position reference signal having a generally ramp-shaped characteristic curve of signal magnitude versus angular shaft displacement from a given reference point, and a control signal generating means responsive to said shaft position reference signal for generating a control signal for said controlled component which control signal transfers from an OFF value corresponding to the OFF state of said controlled component to an ON value corresponding to the ON state of said controlled component when said shaft position reference signal reaches an adjustable ON set point magnitude and which transfers from said ON value to said OFF value when said shaft position reference signal reaches an adjustable OFF set point magnitude as said reference signal increases in magnitude and regardless of whether said ON set point magnitude is adjusted to be higher or lower than said OFF set point magnitude.

* * * * *